United States Patent
Hinton et al.

(10) Patent No.: US 8,793,689 B2
(45) Date of Patent: Jul. 29, 2014

(54) REDUNDANT MULTITHREADING PROCESSOR

(75) Inventors: Glenn J. Hinton, Portland, OR (US);
Steven E. Raasch, Shrewsbury, MA (US); Avinash Sodani, Portland, OR (US); Sebastien Hily, Portland, OR (US); John G. Holm, Beaverton, OR (US); Ronak Singhal, Portland, OR (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 12/797,361

(22) Filed: Jun. 9, 2010

(65) Prior Publication Data

US 2011/0307894 A1    Dec. 15, 2011

(51) Int. Cl.
| | |
|---|---|
| G06F 9/46 | (2006.01) |
| G06F 15/00 | (2006.01) |
| G06F 7/38 | (2006.01) |
| G06F 9/00 | (2006.01) |
| G06F 9/44 | (2006.01) |

(52) U.S. Cl.
USPC .......... 718/100; 712/220; 712/244; 712/245; 712/248

(58) Field of Classification Search
USPC .............. 718/100, 102; 712/220, 244, 245
See application file for complete search history.

(56) References Cited

U.S. PATENT DOCUMENTS

| | | | | |
|---|---|---|---|---|
| 6,366,530 | B1* | 4/2002 | Sluiter et al. | 365/240 |
| 2001/0037445 | A1* | 11/2001 | Mukherjee | 712/216 |
| 2001/0037447 | A1* | 11/2001 | Mukherjee et al. | 712/239 |
| 2001/0037448 | A1* | 11/2001 | Mukherjee et al. | 712/244 |
| 2004/0230975 | A1* | 11/2004 | Gewirtz et al. | 718/100 |
| 2006/0107263 | A1* | 5/2006 | Benhase et al. | 718/100 |
| 2007/0106990 | A1* | 5/2007 | Kissell | 718/102 |
| 2008/0077921 | A1* | 3/2008 | Chaudhary et al. | 718/100 |
| 2009/0235262 | A1* | 9/2009 | Ceze et al. | 718/102 |
| 2010/0169582 | A1* | 7/2010 | Hinton et al. | 711/146 |
| 2010/0169628 | A1* | 7/2010 | Hinton et al. | 712/244 |
| 2011/0023032 | A1* | 1/2011 | Shorb | 718/100 |

OTHER PUBLICATIONS

Reinhardt et al, "Transient Fault Detection via Simultaneous Multithreading", 27th Annual International Symposium on computer Architecture, Jun. 2000, pp. 1-12.*
Mukherjee, Shubhendu S., et al., "Detailed Design and Evaluation of Redundant Multithreading Alternatives", (2002), Whole document.

* cited by examiner

Primary Examiner — Charles Swift
(74) Attorney, Agent, or Firm — Trop, Pruner & Hu, P.C.

(57) ABSTRACT

A redundant multithreading processor is presented. In one embodiment, the processor performs execution of a thread and its duplicate thread in parallel and determines, when in a redundant multithreading mode, whether or not to synchronize an operation of the thread and an operation of the duplicate thread.

23 Claims, 5 Drawing Sheets

REDUNDANT MULTITHREADING PROCESSOR

FIELD OF THE INVENTION

Embodiments of the invention relate to microprocessors; more particularly, embodiments of the invention relate to redundant multithreading processors.

BACKGROUND OF THE INVENTION

Processors, like other integrated circuits, are vulnerable to transient faults caused by strikes from alpha particles and cosmic radiation. These faults may lead to errors in the processor's operation, known as "soft" errors since they do not reflect a permanent malfunction of the device. Strikes by cosmic ray particles, such as neutrons, are particularly noteworthy because of the absence of any practical way to protect from such strikes. The rate at which processor soft errors occur is referred to as the soft error rate (SER). Note that it is possible for some errors to corrupt data without the error being detected. The rate at which these events occur is referred to as the silent data corruption (SDC) rate.

The failure rate of a circuit is related to both the size of the transistors and the circuit supply voltage. As transistors shrink in size with succeeding technology generations, they become individually less vulnerable to cosmic ray strikes. However, this size reduction is usually accompanied by a reduction in supply voltage which increases susceptibility. Overall, decreasing voltage levels and exponentially increasing transistor counts cause chip susceptibility to increase rapidly. Additionally, error rates (measured in failures per unit time) are additive, which means that achieving a particular failure rate for a multiprocessor server requires a correspondingly lower failure rate for its associated individual processors.

Similarly, fault detection support may reduce a processor's SDC rate by halting computation before faults can propagate to permanent storage. Parity, for example, is a well-known fault detection mechanism that eliminates SDC for single bit upsets in memory structures. Unfortunately, adding parity to latches or logic in a high-performance processor can adversely affect its cycle time and overall performance. Additionally, adding such codes to random logic is not straightforward and current design tools do not support such an option.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
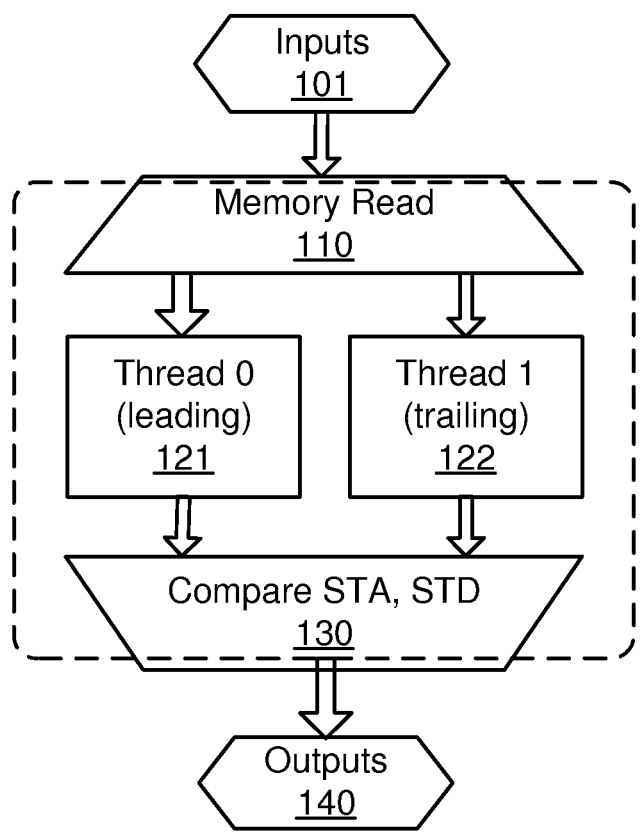
FIG. 1 is a redundant multithreading system in accordance with one embodiment of the invention.

A redundant multithreading (RMT) processor is presented. In one embodiment, the processor performs execution of a thread and its duplicate thread in parallel and determines, when in a redundant multithreading mode, whether or not to synchronize an operation of the thread and an operation of the duplicate thread.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for redundant multithreading processors. Specifically, the redundant multithreading processors are primarily discussed in reference to multi-core processor computer systems. However, the redundant multithreading processors are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

A redundant multithreading (RMT) processor is presented. In one embodiment, the processor performs execution of a thread and its duplicate thread in parallel and determines, when in a redundant multithreading mode, whether or not to synchronize an operation of the thread and an operation of the duplicate thread. In one embodiment, the processor is operable to synchronize the operations at a retirement stage.

FIG. 1 is a redundant multithreading system in accordance with one embodiment of the invention. Many related components such as buses and peripherals have not been shown to avoid obscuring the invention. Referring to FIG. 1, the system includes inputs 101, memory read unit 110, thread 121, thread 122, compare-store unit 130, and outputs 140. In one embodiment, threads 121-122 are hardware threads.

Referring to FIG. 1, in one embodiment, threads 121-122 in an RMT processor execute identical streams of code during RMT operation. If two corresponding store operations differ, compare-store unit 130 asserts an error signal. The primary thread (e.g., thread 121) is referred to herein as a leading thread, whereas the corresponding duplicate (i.e., thread 122) is referred to herein as a trailing thread (a redundant thread). It will be appreciated by those skilled in the art that the leading thread and the trailing thread are executed in parallel but not in an entirely lock-stepped manner. Operations of a leading thread may execute earlier or later than corresponding operations of the trailing thread.

Examples of situations in which exact redundant execution is not performed include exceptions and external interrupts (IRQs). In one embodiment, the RMT system enters non-redundant execution mode (NRE). The RMT system continues executing code in thread 121 until an exceptional condition is resolved, and then overwrites the state of thread 122 with the state of thread 121. The RMT system resumes the RMT operation.

Some examples of situations where thread resynchronization are performed are described herein. In one embodiment, instructions of thread 121 executed without a redundant copy are marked as non-redundant in order to allow for correct structure entry de-allocation and to inhibit cross-thread checking. In one embodiment, thread 121 is stalled at point where the architectural state of the machine is valid (generally, only the retire/commit stage is stalled). Thread 122 is stalled at a front-end stage. The architectural state of thread 122 is reset. In one embodiment, the architectural state (including an instruction pointer) of thread 121 is accessed to initialize at least part of the architectural state of thread 122.

In one embodiment, after thread 122 is initialized, stalls on both threads are removed. In one embodiment, if thread 121 modifies non-architectural state (e.g. control registers), any writes to the non-register state are made to both the threads. The updates are made simultaneously or sequentially as long as the updates are complete prior to the restart of thread 122.

Figure 2:
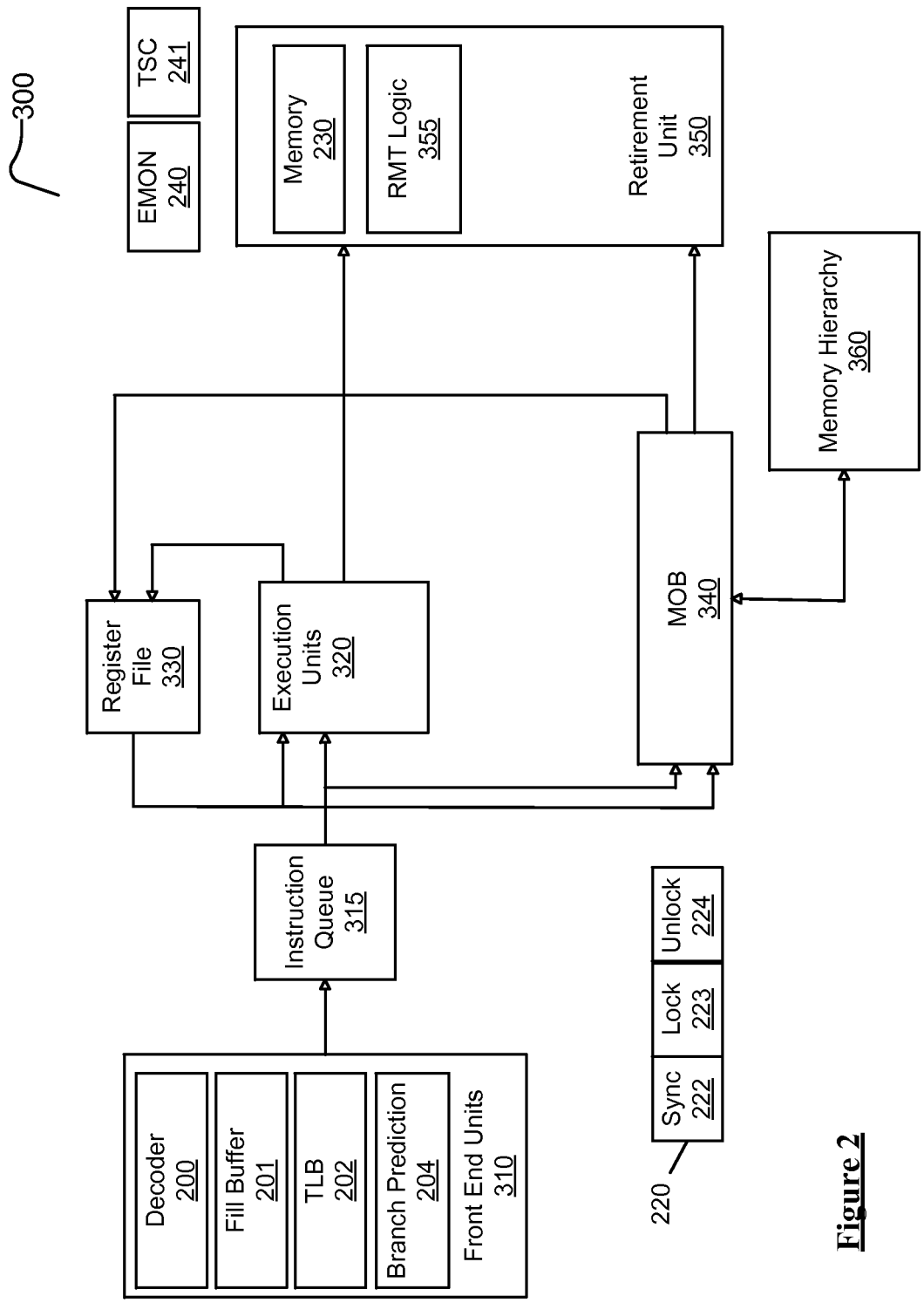
FIG. 2 is a block diagram of a processor in accordance with one embodiment of the present invention.

FIG. 2 is a block diagram of a processor in accordance with one embodiment of the present invention. Referring to FIG. 2, processor 300 may be a multi-stage pipelined out-of-order processor, although embodiments may equally be used with an in-order processor. Processor 300 is shown with a relatively simplified view to illustrate various features as described above. In one embodiment, processor 300 includes multiple cores (only one core is shown in the embodiment of FIG. 2).

In one embodiment, processor 300 includes front end units 310, instruction queue 315, register file 330, execution units 320, retirement unit 350, memory order buffer 340, EMON 240, and TSC 241. EMON 240 and TSC 241 are internal counters. In one embodiment, front end units 310 further include decoder 200, fill buffer 201, translation lookaside buffer (TLB) 202, and branch prediction unit 204. Retirement unit 350 includes memory 230 and RMT logic 355. Memory 220 includes entries with fields such as, for example, sync bit 222, lock bit 223, and unlock bit 224.

In one embodiment, front end units 310 fetch macro-instructions to be executed and prepare them for use later in the processor. The fetching may be based on an instruction pointer (IP) of the hardware thread. In one embodiment, front end units 310 include an instruction pre-fetcher, a trace cache, micro-code storage and micro-operation storage (not shown). The instruction pre-fetcher fetches macro-instructions from memory and feeds them to decoder 200 to decode them into primitives, i.e., micro-operations.

In one embodiment, front end units 310 and execution units 320 are coupled via instruction queue 315. Instruction queue 315 receives micro-instructions and stores them prior to execution. In one embodiment, instruction queue 315 include various buffers to re-order micro-instruction flow and allocate various resources needed for execution, as well as to provide renaming of logical registers onto storage locations within various register files such as register file 330. In one embodiment, register file 330 includes separate register files for integer and floating point values. When a given redundant thread is executing, its register values may be stored in register file 330.

In one embodiment, various resources are present in execution units 320, including, for example, various integer, floating point, and single instruction multiple data (SIMD) logic units, among other hardware.

In one embodiment, memory order buffer (MOB) 340 includes control logic, a load buffer, a store buffer, and the like. MOB 340 includes various entries each including information associated with a given load or store value. The information from various entries in MOB 340 is used by retirement unit 350. While shown as a separate unit in the embodiment of FIG. 2, understand that in various implementations a retirement stage includes both the logic of retirement unit 350 as well as the structures of MOB 340.

In one embodiment, retirement unit 350 is used to retire instructions after the instructions have been executed. In one embodiment, retirement unit 350 includes RMT logic 355. RMT Logic 355 controls entry into and exit from redundant mode and performs thread synchronization. RMT logic will be described in further detail below.

In one embodiment, memory hierarchy 360 is coupled to MOB 340. Memory hierarchy 360 includes on-chip cache, an off-chip cache memory, a system memory such as, for example, a dynamic random access memory (DRAM), and mass storage such as, for example, a hard drive. In one embodiment, memory hierarchy 360 store at least a part of the hardware thread contexts for the trailing threads.

Thread Synchronization

In one embodiment, processor 300 performs operations which require thread synchronized. In one embodiment, the synchronization is performed in conjunction with a retirement stage. Operations (e.g., write operations to non-renamed state) require that the operations occur "at the same time" across the two threads (the leading thread and the trailing thread). In one embodiment, RMT logic 355 enables the operations to synchronize at the retirement stage and then the operations retire either simultaneously or in a back-to-back manner, in order to achieve correct execution. The effect of a back-to-back retirement is indistinguishable from a simultaneous retirement if there are no intervening operations, especially those that change the architectural state. In one embodiment, an instruction may need to be synchronized at other stages (e.g., decode, rename, dispatch, execute, or writeback).

In one embodiment, processor 300 is operable to determine when whether or not to synchronize an operation of a leading thread and the operation of a trailing thread in RMT operation and to perform execution of the leading thread and the trailing thread in parallel. For thread synchronization, processor 300 retires both operations back-to-back or begins processing the retirement of both operations in a same clock cycle. In one embodiment, processor 300 is operable to retire the operations consecutively without any other intervening operation, to synchronize the leading and the trailing threads.

In one embodiment, examples of operations that processor 300 performs synchronization include a load-lock operation, an un-cached load operation, an operation that read an internal register (or counter). Processor 300 sets and unsets a synchronization bit (e.g., sync bit 222) associated with an operation (or the associated instruction). The synchronization bit is indicative of whether synchronization is required, for example, at the retirement stage for the operation. In one embodiment, processor 300 decodes an operation at the retirement stage to identify whether or not to perform synchronization on the operation.

Load-Lock Operations

In one embodiment, processor 300 performs load-lock operations. Load-lock operations are executed at retirement to ensure that the operations are not dispatched speculatively. To ensure that both threads receive the same data value, load-lock operations are synchronized at retirement. In one embodiment, decoder 200 is where data replication occurs. Both load-lock operations are dispatched, but only one executes the locking operation. For this reason, the lock attribute (e.g., lock 223) of the trailing load-lock operation is removed, turning the load-lock operation into a simple load operation.

In one embodiment, no modification is needed for the store-unlock operation if the leading thread is the only thread that dispatches store operations. In one embodiment, a store-unlock operation of the trailing thread is modified to become a normal store operation (e.g., by clearing unlock bit 224 associated with the store operation).

In one embodiment, the first load operation executes the locking and unlocking operation, ensuring that the correct value is stored in a data cache. The second load operation receives the same value via a "senior-load" mechanism.

In one embodiment, decoder 200 decodes a load-lock operation of the leading thread. Decoder 200 converts a corresponding load-lock operation of the trailing thread to a normal load operation. Decoder decodes a store-unlock operation of the leading thread and converts a corresponding store-unlock operation of the trailing thread to a store operation.

Un-Cached Load Operations

In one embodiment, processor 300 performs un-cached load operations. Un-cached load instructions are synchronized and executed, for example, at retirement. The leading thread issues a load operation and leaves a copy of the load value in a buffer (e.g., an entry in fill buffer 201) after the load operation completes. The trailing thread executes the corresponding un-cached load operation and retrieves the "cached" value from the buffer. In one embodiment, the un-cached load operation of the trailing thread deallocates the entry in fill buffer 201.

In one embodiment, processor 300 stores a load value, accessed by an un-cached load operation of the leading thread, to a fill buffer so that the load value is accessed by a corresponding un-cached load operation of the trailing thread.

Reading Internal Counters

In one embodiment, processor 300 performs operations that read TSC and EMON counters. The values returned by reading an internal counter will be different because two different threads perform read operations at different time. The values of the internal counters will be used to determine the control path of a program or will be used as the values of store operations. In one embodiment, such read operations are executed at retirement (instead of in the execute stage). The operation is synchronized at retirement and the value read by the first thread will be transferred to the second thread via a small buffer (e.g., memory 230) at the retirement stage. In one embodiment, processor 300 replicates a value to memory 230 so that the value is accessed by a read counter operation of a trailing thread.

Shared TLB Entries

In one embodiment, processor 300 uses shared TLB entries. In one embodiment, both a leading thread and a trailing thread execute the same instructions in a same memory address space. In this case, performance improvement is possible for some workloads if TLB entries (e.g. TLB 202) are shared between the threads instead of partitioning the entries exclusively to either of the threads. In one embodiment, all entries of TLB are available to each thread. In one embodiment, TLB 202 includes entries accessible by the leading and the trailing threads. The entries are not partitioned exclusively to either of the threads.

Way Predictor Update

In one embodiment, processor 300 inhibits some of the TLB predictor update operations. In one embodiment, processor 300 incorporates cache-way prediction to select a cache-bank before the tag-match is done, for example, in an instruction TLB. The way misprediction will cause a predictor update and immediate replay of a lookup. The mechanism is problematic for a structure shared between threads. For example, the second thread may arrive before the replay and also modify the way predictor potentially causing live lock. In one embodiment, processor 300 inhibits the later thread (or the second thread) from updating the predictor to avoid causing a miss to the predictor again while the replay is in progress. The later thread is not allowed to update the predictor until the first thread has successfully completed the lookup.

Branch Prediction

In one embodiment, processor 300 uses branch predictor (e.g., branch prediction unit 204) to improve performance.

Both threads execute the same path through identical code. Sharing a branch predictor table between a leading thread and a trailing thread may increase the prediction accuracy. In one embodiment, branch history values are not shared between threads because the threads could have taken slightly different branch paths to reach a corresponding point in execution. In one embodiment, prediction accuracy is improved if only one thread updates the tables.

Figure 3:
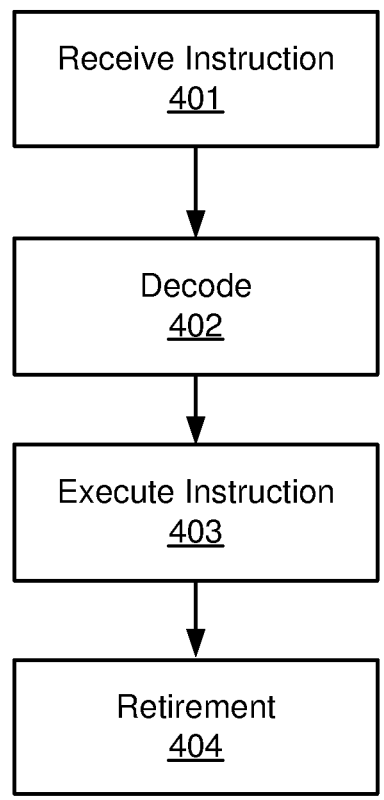
FIG. 3 is a flow diagram of one embodiment of a process in conjunction with a redundant multithreading mechanism.

FIG. 3 is a flow diagram of one embodiment of a process in conjunction with a redundant multithreading mechanism. The process is performed by processing logic that may comprise hardware (circuitry, dedicated logic, etc.), software (such as one that is run on a general purpose computer system or a dedicated machine), or a combination of both. In one embodiment, the process is performed in conjunction with a processor 300 with respect to FIG. 2. In one embodiment, the process is performed by a computer system with respect to FIG. 5.

Referring to FIG. 3, in one embodiment, processing logic begin by receiving an instruction (process block 401). Processing logic decodes the instruction (process block 402).

In one embodiment, processing logic decodes a lock-load operation of a leading thread and converts a corresponding lock-load operation of the trailing thread to a normal load operation. In one embodiment, processing logic decodes a store-unlock operation of the leading thread and converts a corresponding store-unlock operation of the trailing thread to a store operation.

In one embodiment, processing logic executes an instruction (process block 403). In one embodiment, processing logic retires the instruction (process block 404).

In one embodiment, processing logic executes a leading thread and a trailing thread in parallel if processing logic is operating in a redundant multithreading mode. Processing logic determines whether or not to synchronize an operation of the leading thread and a corresponding operation of the trailing thread, for example, at a retirement stage. In one embodiment, processing logic retires the operations in a same clock cycle or in two consecutive clock cycles so that execution results are correctly synchronized.

In one embodiment, processing logic sets a synchronize bit indicative of whether synchronization is required, for example, when the operations reach the retirement stage. In one embodiment, processing logic retrieves a load value in response to an un-cached load operation of a first thread and stores the load value to a buffer. Processing logic accesses the buffer to retrieve the load value in response to a corresponding un-cache load operation of a second thread. Processing logic de-allocates the entry of the load value from the buffer after the access.

In one embodiment, processing logic retrieves a value from an internal register in response to a read (load) counter operation of a first thread. Processing logic replicates the values to a memory. Processing logic later accesses the memory to retrieve the value in response to a corresponding load counter operation of a second thread, for example, when at the retirement stage.

Figure 4:
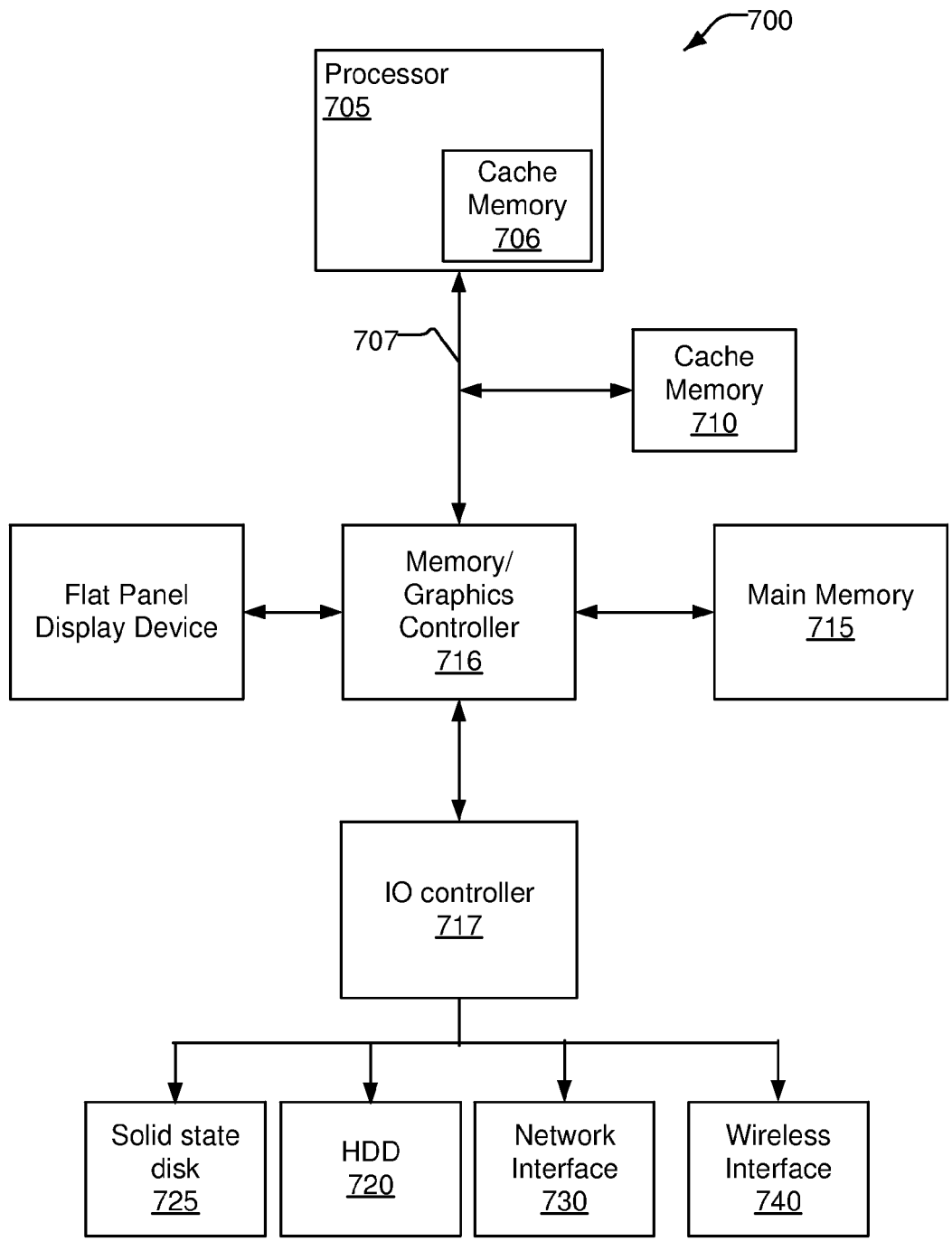
FIG. 4 illustrates a computer system for use with one embodiment of the present invention.

FIG. 4, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

Figure 5:
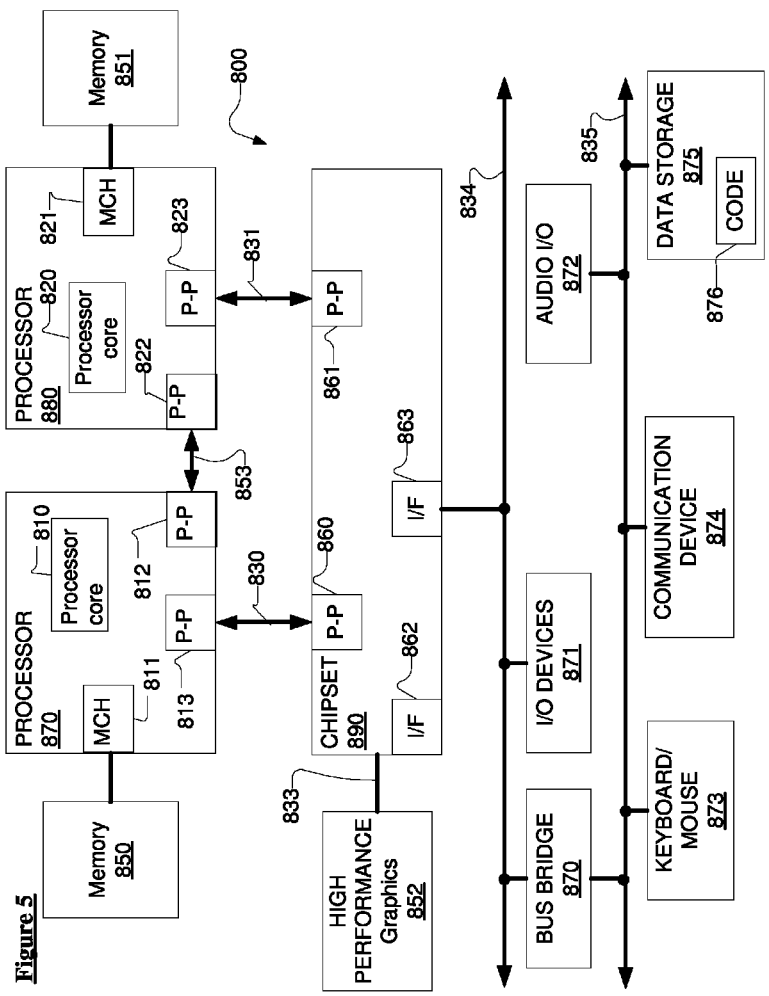
FIG. 5 illustrates a point-to-point computer system for use with one embodiment of the invention.

The system of FIG. 5 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
a processor to:
execute a first thread and a second thread in parallel;
determine, using redundant multithreading logic at a retirement unit that is to retire instructions comprising operations after the instructions have been executed, whether to synchronize a first operation of the first thread and a second operation of the second thread at the retirement unit, and if it is determined to synchronize the first operation of the first thread and the second operation of the second thread:
stall the first thread at a retirement stage of the first thread and access a first architectural state associated with the first thread;
stall the second thread at a front end stage of the second thread and initialize a second architectural state associated with the second thread based on the first architectural state; and
after initialization of the second architectural state, remove stalls on the first thread and the second thread.

2. The apparatus of claim 1, wherein the processor is operable to retire in the retirement unit the first operation and the second operation consecutively, without an intervening operation, to synchronize the first and the second threads.

3. The apparatus of claim 1, wherein the processor is operable to begin to process retirement of the first operation and the second operation in a same clock cycle.

4. The apparatus of claim 1, wherein the processor is to:
determine that synchronization is to occur based upon identification of the first operation type to be load-lock; and
responsive to a determination that synchronization is to occur, convert the second operation from a load-lock operation to a load operation.

5. The apparatus of claim 1, wherein the processor comprises a decoder unit to:
decode a store-unlock operation of the first thread; and
convert a corresponding store-unlock of the second thread to a store operation.

6. The apparatus of claim 1, wherein the processor is to set or unset a synchronize indicator based on a first operation type associated with the first operation, wherein the synchronize indicator is indicative of whether synchronization is required.

7. The apparatus of claim 1, wherein the processor is to replicate a value of an internal counter at the processor to a memory to be accessed by a load internal counter operation of the second thread.

8. The apparatus of claim 1, wherein the processor comprises a translation lookaside buffer comprising entries accessible by the first and the second threads, without partitioning the entries exclusively to either of the threads.

9. The apparatus of claim 8, wherein the processor is to inhibit, while a replay caused by the first thread is in progress, the second thread from updating a prediction table for use to access the translation lookaside buffer.

10. The apparatus of claim 1, wherein the processor comprises a branch prediction table comprising entries accessible by the first and the second threads without partitioning the entries exclusively to either of the threads.

11. The apparatus of claim 1, wherein the processor is to decode the first operation at the retirement stage of the first thread to identify whether to synchronize the first operation and the second operation.

12. The apparatus of claim 11, wherein the redundant multithreading logic is to determine to synchronize the first operation of the first thread and the second operation of the second thread responsive to detection by the processor at the retirement stage that the first operation is an un-cached load operation.

13. The apparatus of claim 1, further comprising, when it is determined to synchronize the first operation of the first thread and the second operation of the second thread and when the first operation includes a write to a first control register associated with the first thread, the processor is to execute, simultaneously or sequentially, a write to a second control register associated with the second thread prior to a restart of the second thread.

14. A method comprising:
executing, by a processor, a first thread and a second thread in parallel in a redundant multithreading mode;
determining, at a retirement unit of the processor, whether to synchronize a first operation of the first thread and a second operation of the second thread, wherein the retirement unit is to retire instructions comprising operations after the instructions have been executed;
decoding the first operation and identifying a first operation type associated with the first operation; and
responsive to identification of the first operation type as load-lock, converting a corresponding load-lock operation of the second thread to a normal load operation.

15. The method of claim 14, further comprising processing, by the retirement unit, retirement of the first operation and the second operation in a same clock cycle.

16. The method of claim 14, further comprising:
decoding a store-unlock operation of the first thread; and
converting a corresponding store-unlock of the second thread to a store operation.

17. The method of claim 14, further comprising:
if it is determined to synchronize the first operation and the second operation and when the first operation comprises an un-cached load operation of the first thread:
retrieving a load value in response to execution of the first operation;
storing the load value to a buffer;
accessing the buffer to retrieve the load value in response to execution of the second operation, wherein the second operation comprises a corresponding un-cached load operation of the second thread; and
after accessing the buffer to retrieve the load value, deallocating an entry of the load value from the buffer.

18. The method of claim 14, further comprising:
retrieving a value from an internal counter responsive to identification of the first operation as a load counter operation that reads an internal register;
replicating the value to a memory; and
accessing the memory to retrieve the value in response to execution of the second operation comprising a corresponding load counter operation of the second thread at a retirement stage.

19. The method of claim 14, wherein synchronizing includes:
stalling the first thread at a retirement stage of the first thread and accessing a first architectural state associated with the first thread;

stalling the second thread at a front end stage of the second thread and initializing a second architectural state associated with the second thread based on the first architectural state; and after initializing the second architectural state, removing stalls on the first thread and the second thread.

20. A system comprising:
a main memory; and
a processor including:
  execution logic to execute a first thread and a second thread in parallel; and
  a retirement unit to:
    retire instructions after the instructions have been executed, wherein each instruction includes one or more operations; and
    determine whether to synchronize a first operation of the first thread and a second operation of the second thread,
  wherein when it is determined to synchronize the first operation of the first thread and the second operation of the second thread, if the first operation comprises an un-cached load operation of the first thread, the processor is to:
    retrieve a load value in response to execution of the first operation;
    store the load value to a buffer;
    access the buffer to retrieve the load value in response to execution of the second operation, wherein the second operation comprises a corresponding un-cached load operation of the second thread; and
    after the buffer is accessed to retrieve the load value, deallocate an entry of the load value from the buffer.

21. The system of claim 20, wherein if the first operation comprises a load-lock operation of the first thread, the processor is to decode the first operation and to convert a corresponding load-lock operation of the second thread to a load operation.

22. The system of claim 20, wherein the processor is to replicate, in response to execution of the first operation, a value to a memory to be accessed by the second operation.

23. The system of claim 20, wherein the processor comprises a translation lookaside buffer comprising entries accessible by the first and the second thread, without partitioning the entries exclusively to either of the first thread and the second thread.

* * * * *